United States Patent
Teishi et al.

(10) Patent No.: US 6,783,171 B2
(45) Date of Patent: Aug. 31, 2004

(54) AUTOMOTIVE WEATHERSTRIP

(75) Inventors: Minoru Teishi, Hiroshima (JP);
Takashi Yamashita, Hiroshima (JP);
Takashi Ogawa, Saitama-ken (JP)

(73) Assignees: Nishikawa Rubber Co., Ltd., Hiroshima (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/180,731

(22) Filed: Jun. 27, 2002

(65) Prior Publication Data
US 2003/0020301 A1 Jan. 30, 2003

(30) Foreign Application Priority Data
Jun. 28, 2001 (JP) ........................................ 2001-197083

(51) Int. Cl.[7] .............................................. B60J 10/08
(52) U.S. Cl. .................... 296/146.9; 49/479.1; 49/482.1
(58) Field of Search ........................ 296/146.9; 49/377, 49/479.1, 482.1, 484.1, 498.1

(56) References Cited

U.S. PATENT DOCUMENTS

| | | | | |
|---|---|---|---|---|
| 1,270,869 A | * | 7/1918 | Relling | |
| 4,374,880 A | * | 2/1983 | Mesnel | |
| 4,531,326 A | * | 7/1985 | Ballocca et al. | |
| 4,769,947 A | * | 9/1988 | Ogawa et al. | |
| 4,894,954 A | * | 1/1990 | Nozaki et al. | |
| 4,910,918 A | * | 3/1990 | Naples et al. | |
| 4,969,294 A | * | 11/1990 | Guillon et al. | |
| 4,970,102 A | * | 11/1990 | Guillon | |
| 4,977,706 A | * | 12/1990 | Kisanuki | |
| 5,035,937 A | | 7/1991 | Nozaki | |
| 5,258,157 A | | 11/1993 | Nozaki et al. | |
| 5,269,101 A | * | 12/1993 | Nozaki et al. | ............. 49/479.1 |
| 5,718,084 A | * | 2/1998 | Takamiya | ................... 49/479.1 |
| 5,797,644 A | * | 8/1998 | Hamabata | ................ 296/146.9 |
| 5,851,048 A | * | 12/1998 | Fujita et al. | ............. 296/146.9 |
| 6,237,287 B1 | * | 5/2001 | Nakagawa et al. | ........ 49/479.1 |
| 6,240,677 B1 | * | 6/2001 | Baumann | ................... 49/479.1 |
| 6,250,018 B1 | | 6/2001 | Kawai et al. | |
| 6,393,766 B2 | * | 5/2002 | Nozaki et al. | ............. 49/498.1 |
| 2001/0034977 A1 | * | 11/2001 | Hattori | ..................... 49/479.1 |
| 2002/0062596 A1 | * | 5/2002 | Palicki | ..................... 49/479.1 |

FOREIGN PATENT DOCUMENTS

| | | | | |
|---|---|---|---|---|
| GB | 1 431 460 | | 4/1976 | |
| JP | 357147921 A | * | 9/1982 | ................ 49/479.1 |
| JP | 59-124810 | | 7/1984 | |
| JP | 63-222812 | | 9/1988 | |
| JP | 63-295215 | | 12/1988 | |
| JP | 63-302008 | | 12/1988 | |
| JP | 403038430 A | * | 2/1991 | ................ 49/479.1 |
| JP | 404066325 A | * | 3/1992 | ................ 49/479.1 |
| JP | 5-77243 | | 3/1993 | |
| JP | 405139217 A | * | 6/1993 | ............. 296/146.9 |
| JP | 2000-225848 | | 8/2000 | |

* cited by examiner

Primary Examiner—D. Glenn Dayoan
Assistant Examiner—H. Gutman
(74) Attorney, Agent, or Firm—Flynn, Thiel, Boutell & Tanis, P.C.

(57) ABSTRACT

When a sealing portion at an end portion of an extruded weatherstrip is cut out by a fixed length and a main body and a lip are set on a metal mold for die forming, concave portions are formed on a lower surface and side surface of the main body to be set on the metal mold, and are latched, respectively with convex portions of the metal mold to restrict movement. Thus a problem in external appearance caused by movement or bending of a part of the main body including the lip due to a molding pressure is eliminated.

8 Claims, 6 Drawing Sheets

AUTOMOTIVE WEATHERSTRIP

BACKGROUND OF THE INVENTION

The present invention relates to a weatherstrip to be attached to the periphery of an automobile door and, particularly, to a weatherstrip 10 having a die-forming portion to be attached to corner portions A and B of an automobile door as shown in FIG. 1 and a method for molding the same.

FIG. 2 shows an example of a weatherstrip to be attached to a roof portion on the periphery of an automobile door, which comprises a hollow main body 3 to be attached still to an outer peripheral end face 2a of a doorframe with a clip or a double-sided adhesive tape, a hollow sealing portion 4 which press-contacts with a door opening margin of a car body for sealing when the door is closed, and a lip 5 protruding on an outer peripheral limb 2b of the doorframe, wherein by extending the lip 5 to the doorframe end on the center pillar side, external appearance of a corner portion at the center pillar upper end where a die-forming portion is attached is improved.

When such a die-forming portion to be attached to a corner portion is molded, the end portion of an extruded weatherstrip 6 is cut out by a fixed length from the end excluding the lip 5, then an extension 5a of the lip 5 protruding from the main body 3 is set on a metal mold, and a die-forming portion 7 as shown in FIG. 4 is molded by die forming. In the drawing, reference numeral 8 denotes a sealing portion to be connected to the sealing portion 4, and reference numeral 9 denotes a shielding portion which is die-formed for an improvement in external appearance of the end face.

When the aforementioned die-forming portion 7 is molded, the extension 5a of the lip 5 set on the metal mold easily moves and shifts in the lateral direction due to a molding pressure and, therefore, does not stay at a predetermined position. As a result, a problem in external appearance such that the lip line is curved in a molded product easily occurs. Such a problem occurs more easily as a depressing pressure by the mold becomes smaller.

SUMMARY OF THE INVENTION

The present invention is made to solve the above problem and it is an object thereof to provide a weatherstrip and a method for molding the same wherein when a sealing portion of the weatherstrip is cut out by a fixed length from the end and a die-forming portion is molded with the remaining part including a lip set on a metal mold, the part including the lip set on the metal mold is prevented from moving due to a molding pressure, whereby a problem in external appearance caused by a movement and a bend of the lip due to a molding pressure can be eliminated.

A weatherstrip according to the present invention comprises a general portion which is extrusion-molded and to be attached to a roof portion of a doorframe and a die-forming portion which is integrally molded with this general portion and to be attached to a corner portion.

The general portion has a hollow sealing portion which press-contacts with a door opening margin of a car body for sealing when the door is closed and a lip protruding on an outer peripheral limb of a doorframe, and a die-forming portion which is integrally molded with an extension of a part including the lip of the general portion and is to be attached to a corner portion, and this die-forming portion has an extension which is integrally molded with an extension of a part of the general portion including the lip portion and laterally extends to the doorframe end and a sealing portion which is integrated with the sealing portion of the general portion and has a shape along the corner portion. Moreover, position restricting means to the metal mold composed of concave portions and/or convex portions are provided on the extension of the part including the lip.

According to the present invention, when an extension of a part of an extruded molding including a lip is set on a metal mold and die forming is carried out, concave portions and/or convex portions of the extension are latched with convex portions and/or concave portions of the metal mold, whereby the position is restricted and a contact area with the metal mold is increased, resulting in an increase in frictional resistance. Therefore, the extension of the part including the lip is prevented from moving not only in a direction perpendicular to the longitudinal direction but also in the longitudinal direction, thus it becomes possible to make the extension stay at a predetermined position.

The position restricting means of the present invention restrict movement in the direction perpendicular to the longitudinal direction of the extension set on the metal mold as mentioned above, however, it is desirable that such a restriction in movement is imposed not only in the right and left direction but also in the up-and-down direction. Therefore, it is desirable that the concave portions and/or convex portions are formed not only in the up-and-down direction but also in the lateral direction.

In a method for molding a weatherstrip according to the present invention, the end portion of an extruded molding having a hollow sealing portion, a lip protruding on an outer peripheral limb of a doorframe, and position restriction means to a metal mold composed of concave portions and/or convex portions is cut out by a fixed length from the end excluding a part including the lip and position restricting means. Thereafter, the part remaining including the lip and position restricting means after cutting is attached and set on a metal mold by latching the concave portions and/or convex portions of the position restricting means with convex portions and/or concave portions of the metal mold. Then, a die-forming portion is molded by injecting a molding material of, for example, ethylene-propylene diene rubber (EPDM) into the metal mold.

DESCRIPTION OF THE PREFERRED EMBODIMENT

Figure 1:
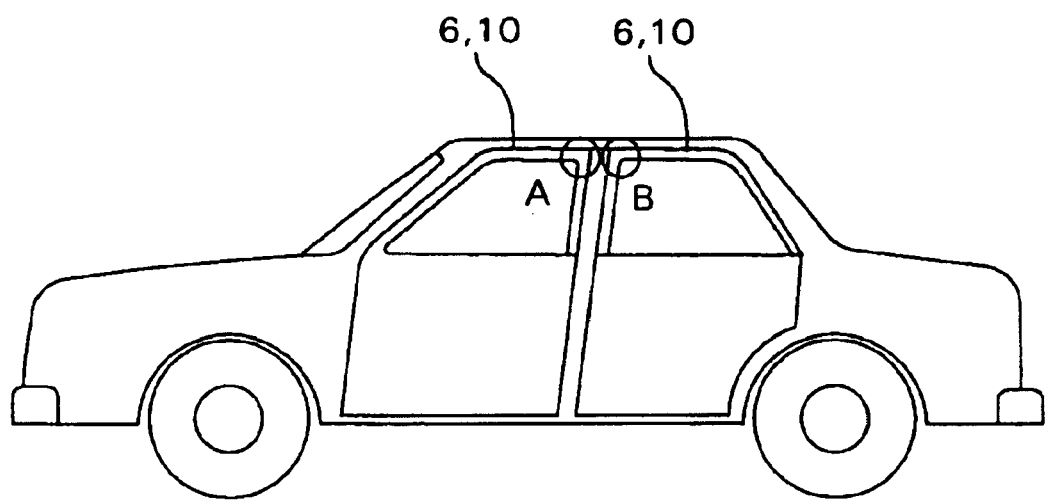
FIG. 1 is a side view of an automobile.
Figure 2:
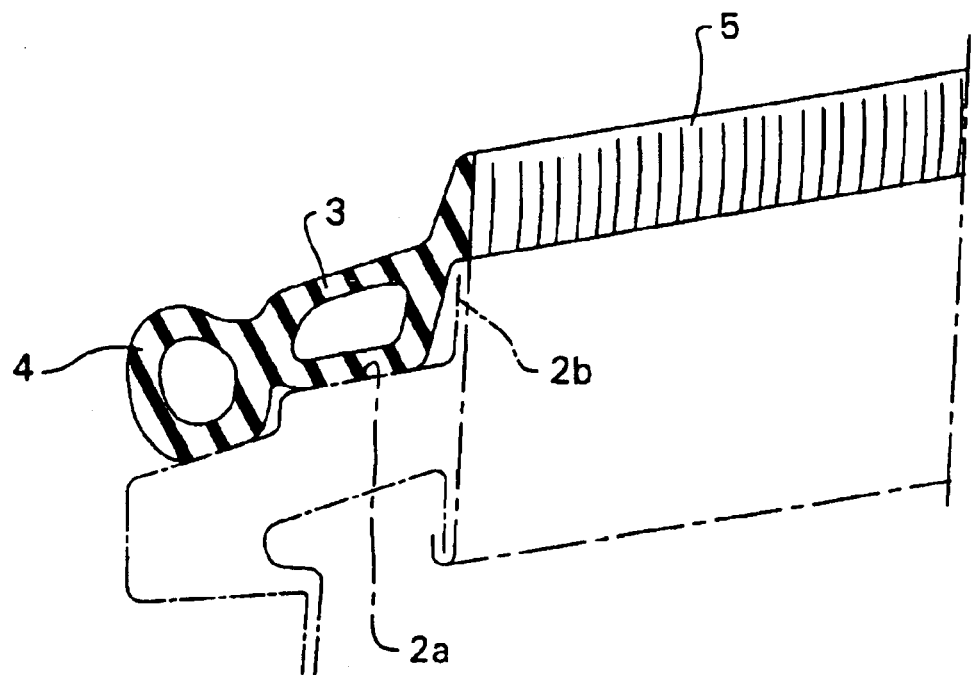
FIG. 2 is a view showing a weatherstrip to be attached to a roof portion.
Figure 3:
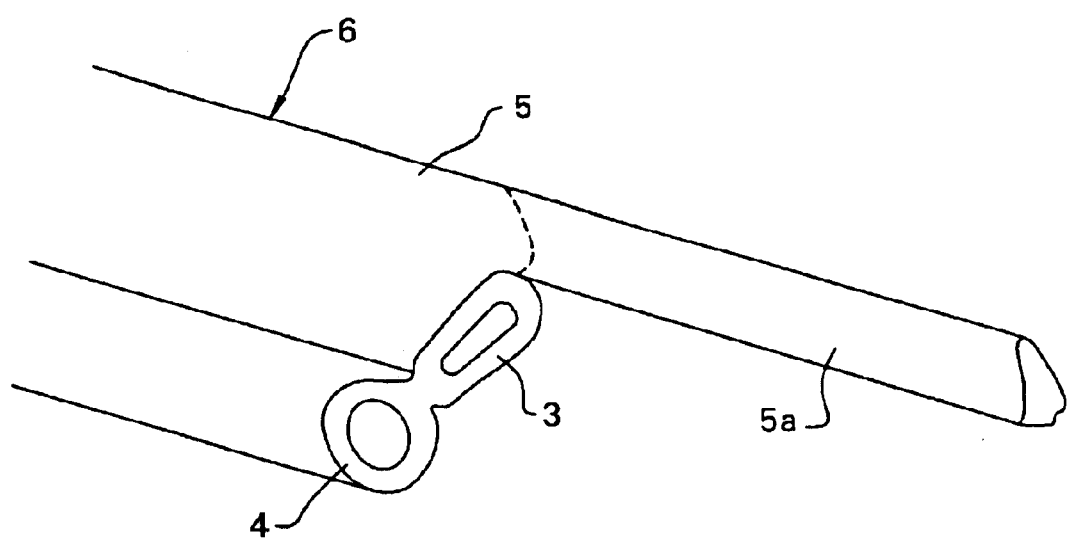
FIG. 3 is a perspective view of an extrusion-molded weatherstrip whose end portion has been cut out by a fixed length excluding a lip thereof.
Figure 4:
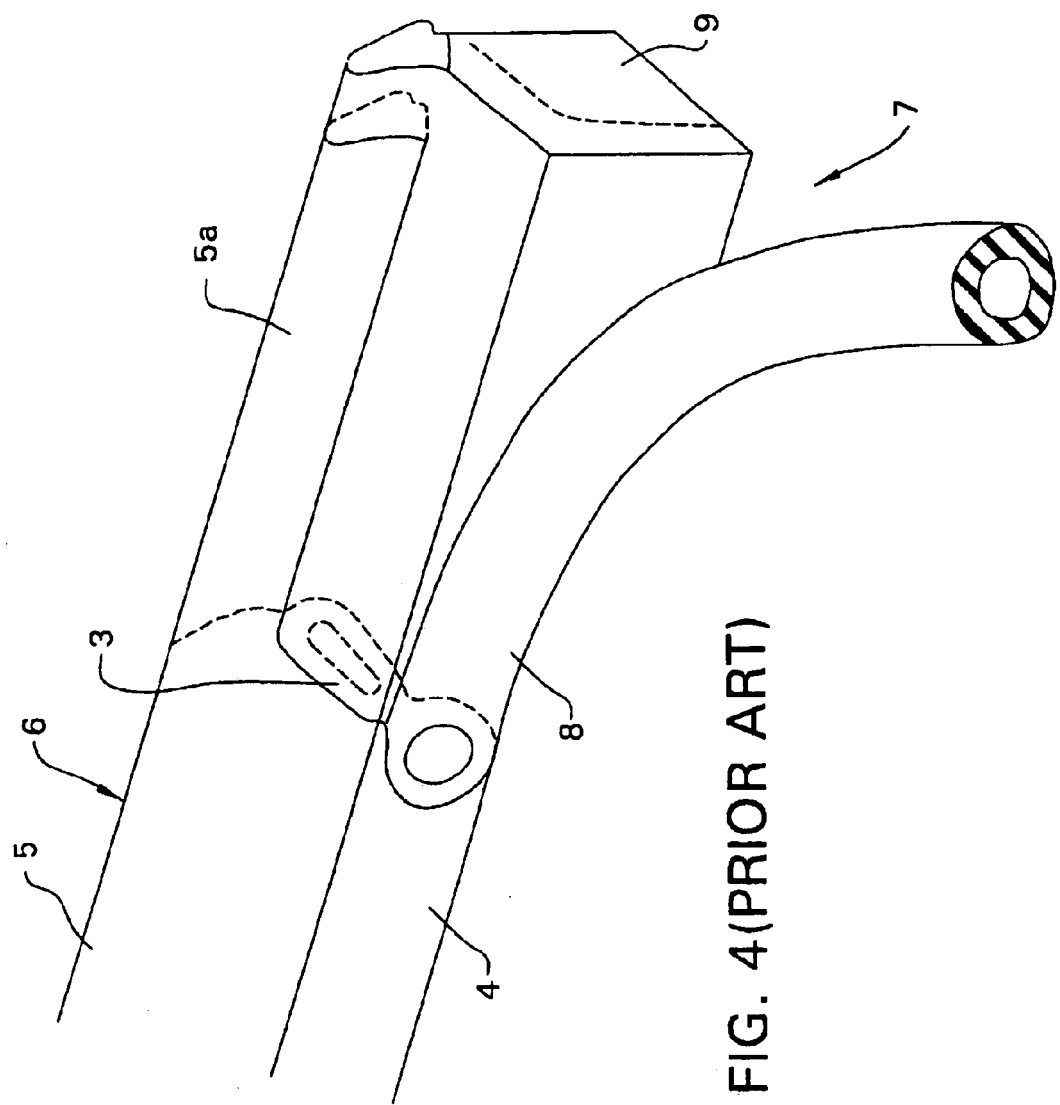
FIG. 4 is a perspective view of a die-forming portion integrally molded with a weatherstrip of a general portion.
Figure 5:
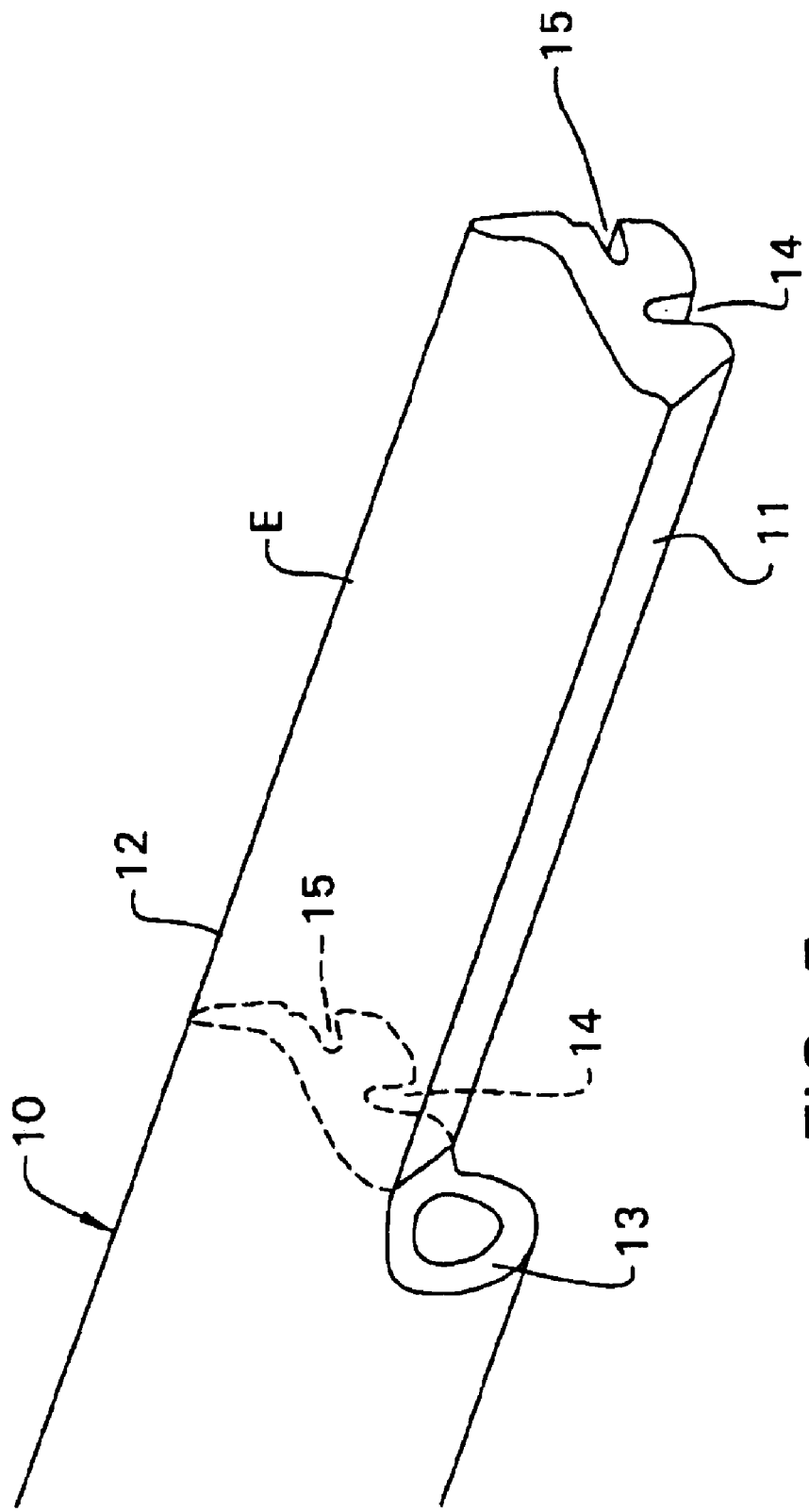
FIG. 5 is a perspective view of an extrusion-molded weatherstrip according to the present invention.

FIG. 5 shows a weatherstrip 10 of a general portion formed of an extrusion molding, to be attached to a roof portion of a doorframe. As shown in FIG. 5, this weatherstrip 10 comprises: a main body 11 to be attached to an outer peripheral end face 2a of a doorframe with a clip or a double-sided adhesive tape, a lip 12 protruding on an outer peripheral limb 2b of the doorframe, and a hollow sealing portion 13 which press-contacts with a door opening margin of a car body for sealing when the door is closed. On the main body 11, a concave portion 14 which serves as a position restricting means is formed upwards from the side to be attached to the outer peripheral end face 2a of the doorframe and a concave portion 15 which similarly serves as a position restricting means is formed sideways from the side surface on the lip side.

Figure 6:
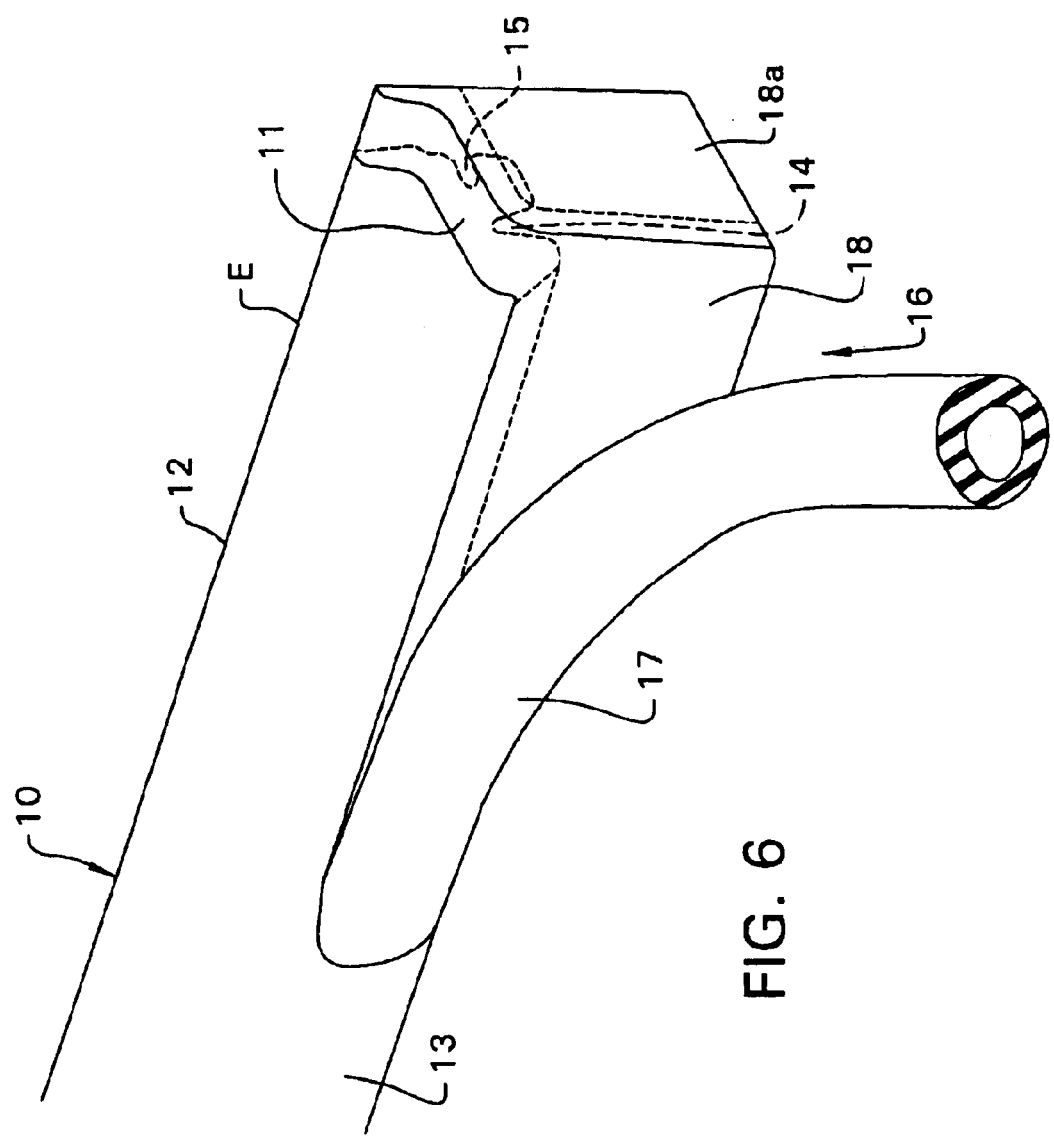
FIG. 6 is a perspective view of a weatherstrip having a die-forming portion.
Figure 7:
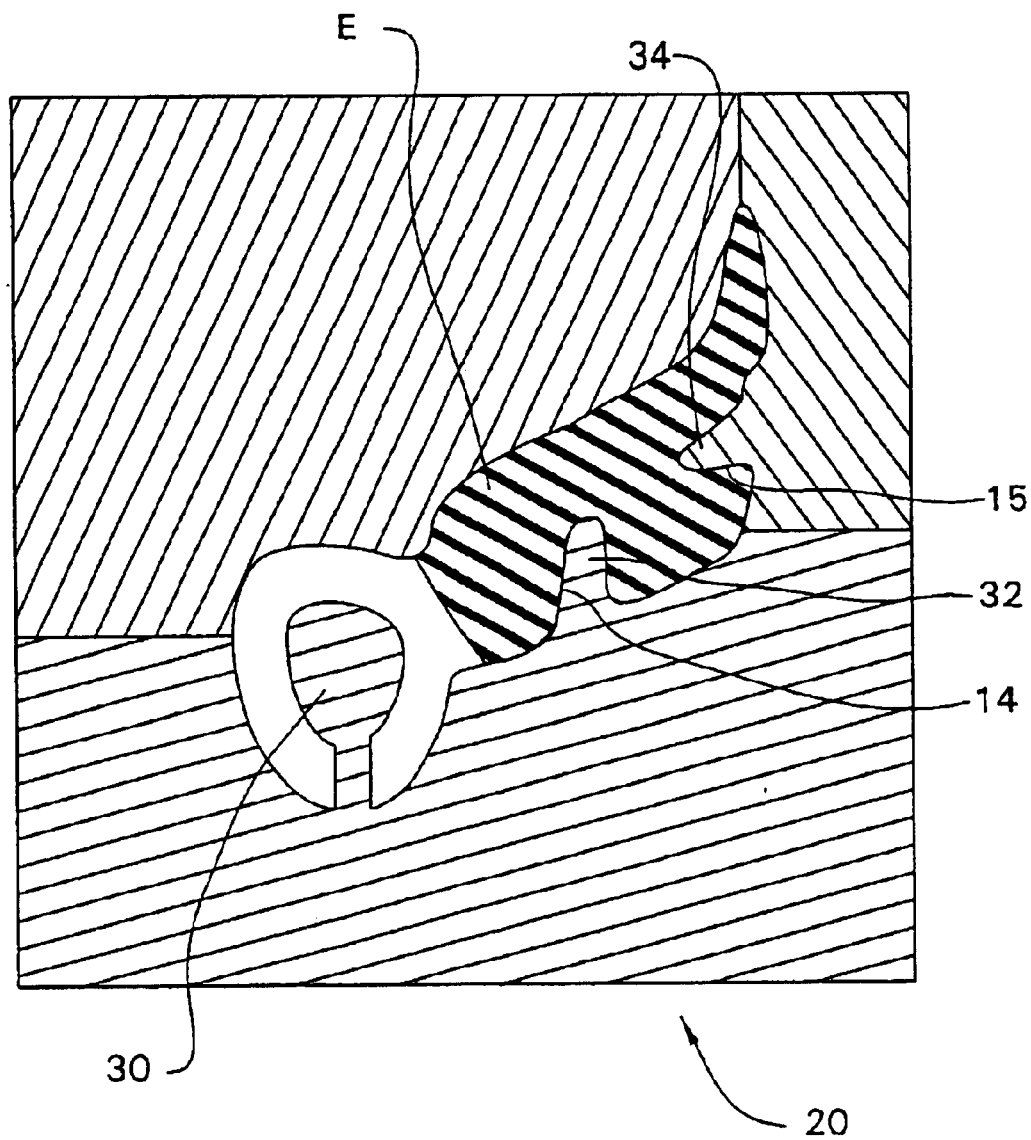
FIG. 7 is a cross-sectional view of a mold receiving therein the extension of the weatherstrip shown in FIG. 5.

In die forming, the end portion of the extrusion-molded weatherstrip 10 shown in FIG. 5 is cut out by a fixed length from the end excluding the main body 11 and the lip 12, that is, the sealing portion 13 is cut out up to a position illustrated by the solid lines. The dotted line portion shows the portion of the main body 11 and lip 12 that is in the same plane as the cut face of the sealing portion 13. Thereafter, the main body 11 extending from the sealing portion 13 and an extension E of the lip 12 are attached and set on a metal mold 20 by latching the concave portions 14 and 15 of the main body 11, respectively, with respective convex portions 32, 34 of the metal mold as shown in FIG. 7. Then a molding material is injected for molding. FIG. 6 shows a die-forming portion 16 integrally molded with the extrusion-molded weatherstrip 10. This die-forming portion 16 comprises a sealing portion 17. In this sealing portion 17, a hole is made by extracting a central core 30 shown in FIG. 7 after the sealing portion 17 has been formed. The sealing portion 17 is connected to the sealing portion 13 and an extension 18 which includes a shielding portion 18a is formed integrally with the sealing portion 17, on the end of the above extension E for an improvement in external appearance of this end face and laterally extends to the doorframe end in a manner integrally formed with the above extension E.

According to the present embodiment, in die forming, the main body 11 and lip 12 are set on the metal mold 20 shown in FIG. 7. Main body 11 and lip 12 are restricted in terms of movement in the lateral (right and left) direction by latching of a convex portion 32 of the metal mold 20 extending into the concave portion 14, and in terms of movement in the up-and-down direction, by latching of different convex portion 34 of the metal mold 20 extending into the concave portion 15. The main body 11 and lip 12 are also depressed by the metal mold 20 in a condition where a contact area with the metal mold has been increased by the convex portions 32, 34 of the metal mold 20 latched into both concave portions 14 and 15, respectively. Therefore, a frictional resistance to the metal mold 20 is increased and movement in the longitudinal direction is also restricted.

Although the present invention has been described in terms of preferred embodiments thereof, it is obvious to a person skilled in the art that various alterations and modifications are possible without departing from the scope of the present invention which is set forth in the appended claims.

What is claimed is:

1. An automotive weatherstrip to be attached around a periphery of a door of an automobile body comprising:
   a general portion formed of an extruded molding to be attached to a roof portion of a doorframe having a hollow extrusion-formed sealing portion that press-contacts with a door opening margin of an automobile body for sealing when the door is closed and a lip for protruding onto the outer peripheral limb of the doorframe, and
   a die-forming portion which is integrally molded with the general portion for attachment to a corner portion of the doorframe, said die-forming portion having a die-formed extension that is integrally molded with an extrusion-formed extension that is a part of the general portion and laterally extends to a doorframe end and a die-formed sealing portion that is integrated with the extrusion-formed sealing portion of the general portion and has a shape along the corner portion of the doorframe end,
   wherein the extrusion-formed extension includes a first groove having an open end and defining a first opening extending along a length of said extrusion formed extension and a second groove having an open end and defining a second opening extending along a length of said extrusion formed extension,
   wherein the first opening of said first groove opens in a direction transverse to the direction that the second opening of said second groove opens in, so that said first and second grooves are capable of receiving portions of a mold to, in combination, maintain the position of the extrusion-formed extension during molding to the die-forming portion.

2. The weatherstrip of claim 1, wherein said first and second grooves define a cantilevered portion in said extrusion-formed extension extending along a length thereof, and wherein a distance between a base of said first groove and a base of said second groove in a plane perpendicular to the length of said extrusion-formed extension is less than a greatest width of said cantilevered portion in the plane perpendicular to the length of said extrusion-formed extension.

3. A weatherstrip for use with an automobile comprising:
   an elongate extrusion-formed general portion having a length and formed of an extruded molding for attachment to an automobile doorframe, said general portion comprising:
      an elongate extrusion-formed main body formed with at least two of concave or convex portions extending along a length thereof, wherein one of said concave or convex portions is directed in a first lateral direction along the length of said main body and the other of said concave or convex portions is directed in a second different direction along the length of said main body;
      an elongate hollow extrusion-formed sealing portion monolithic with said main body, said extrusion-formed sealing portion having a first closed hollow portion extending the length of said extrusion-formed sealing portion;
      an elongate extrusion-formed lip extending outwardly from and monolithic with said main body for protruding onto an outer peripheral limb of the doorframe; and
      an extrusion-formed extension comprising said main body and said extrusion-formed lip at an end whereat said hollow extruded sealing portion is severed from said general portion; and
   a die-formed portion integrally molded with said general portion for attachment to a corner portion of the doorframe, said die-formed portion comprising:
      a die-formed extension joined at a part of the extrusion-formed general portion of said weatherstrip whereat said extrusion-formed sealing portion is severed, comprising:
         an elongate die-formed hollow sealing portion having a second hollow portion extending the length of said die-formed sealing portion, said elongate die-formed hollow sealing portion being integrated with said extrusion-formed sealing portion of said general portion at the end that is severed so that said first and second hollow portions are in alignment to form a hollow chamber that extends the length of said weatherstrip; and a die-formed shielding portion forming an end face of said weatherstrip so that said extrusion-formed extension is not viewable at the end of said weatherstrip, wherein a portion of a length of said die-formed extension is integrally joined along a length thereof to said extrusion-formed extension.

4. The weatherstrip of claim 3, wherein said extrusion-formed main body is free from apertures.

5. The weatherstrip of claim 3, wherein said at least two of said concave or convex portions comprises a pair of concave portions forming channels extending along the length of said main body.

6. The weatherstrip of claim 3, wherein the second direction is substantially perpendicular to the first direction.

7. A combination including:

an automobile body having a doorframe, said doorframe having a roof portion and an outer peripheral limb;

a door received in the doorframe; and an automotive weatherstrip for attachment around a periphery of the doorframe, said weatherstrip comprising:

an extrusion-formed general portion formed of an extruded molding to be attached to a roof portion of said doorframe, said extrusion-formed general portion comprising:

an extrusion-formed main body formed with at least two of convex and concave portions extending along the length of said main body, wherein one of said concave or convex portions is directed in a first lateral direction along the length of said main body and another of said concave or convex portions is directed in a second different direction along the length of said main body;

a hollow extruded sealing portion extending along a length of said main body for press-contacting with said door when said door is closed;

an extrusion-formed lip extending outwardly from and along the length of said main body and protruding onto the outer peripheral limb of said doorframe; and an extrusion-formed extension comprising said main body and said extrusion-formed lip at an end of said extrusion-formed general portion whereat said hollow extruded sealing portion is severed from said extrusion-formed general portion to define a severed end for said extrusion-formed lip;

a die-formed portion integrally molded with said extrusion-formed general portion for attachment to a corner portion of said doorframe, said die-forming portion comprising:

a die-formed extension joined at a part of the general portion of said weatherstrip whereat said extrusion-formed sealing portion was previously severed;

a die-formed sealing portion that is integrated with the severed end of said extrusion-formed sealing portion of said general portion; and a die-formed shielding portion forming an end face for said weatherstrip so that said extrusion-formed extension is not viewable at the end face of said weatherstrip.

8. The combination of claim 7, wherein said extrusion-formed main body is free from apertures.

* * * * *